United States Patent

McCoy et al.

[19]

[11] Patent Number: 5,813,035
[45] Date of Patent: Sep. 22, 1998

[54] MICROPROCESSOR EMPLOYING A TECHNIQUE FOR RESTORATION OF AN ABORTED CYCLE FOLLOWING A SNOOP WRITEBACK OPERATION

[75] Inventors: Jody A. McCoy; William A. Hughes, both of Austin, Tex.

[73] Assignee: Advanced Micro Devices, Inc., Sunnyvale, Calif.

[21] Appl. No.: 605,871

[22] Filed: Feb. 23, 1996

[51] Int. Cl.⁶ .................................................. G06F 13/00
[52] U.S. Cl. ............................................ 711/146; 711/143
[58] Field of Search ................................. 395/473, 470, 395/445, 468, 240, 449, 471; 364/243.4, 243.41; 711/146, 143, 118, 141, 122, 144; 705/40

[56] References Cited

U.S. PATENT DOCUMENTS

| 4,319,323 | 3/1982 | Ermolovich et al. | 395/427 |
| 4,937,734 | 6/1990 | Bechtolsheim | 395/412 |
| 5,537,536 | 7/1996 | Groves | 395/183.04 |

OTHER PUBLICATIONS

Patterson & Henessy, "Computer Organization & Design: The Hardware/Software Interface", Morgan Kaufmann Publishers, ISBN 1–55860–281–X, pp. B–28–B–29, 1994.

Ralston et al., "Encyclopedia of Computer Science", Third Edition, International Thomson Computer Press, ISBN 1–85032–800–5, pp. 547–549 and 1157, 1993.

*Primary Examiner*—Tod R. Swann
*Assistant Examiner*—Felix B. Lee
*Attorney, Agent, or Firm*—Conley, Rose & Tayon; B. Noel Kivlin

[57] ABSTRACT

A microprocessor is provided with an output pad logic circuit for each of its output lines. Each output pad logic circuit advantageously includes first and second latch circuits each configured to store output information at the same time. When the processor detects that a snoop write-back is pending, the second latch, referred to as a restore latch, preserves the information contained therein. During the snoop write-back operation, only the first latch stores the snoop write-back information and conveys the information to the output pins. When the snoop write-back operation is complete, an output enable signal is provided to the second latch to cause its stored information to be conveyed to the output pins upon the beginning of the next bus cycle. Subsequently, the second latch resumes capturing information along with the first latch. The output pad logic circuits within the microprocessor advantageously allow pipelined operations within the microprocessor and avoid the requirement of additional clock cycles to reload the output latch following a snoop write-back operation.

19 Claims, 4 Drawing Sheets

MICROPROCESSOR EMPLOYING A TECHNIQUE FOR RESTORATION OF AN ABORTED CYCLE FOLLOWING A SNOOP WRITEBACK OPERATION

BACKGROUND OF THE INVENTION

1. Field of the Invention

This invention relates to microprocessors and more particularly to techniques for restoring an aborted cycle following a snoop write-back operation of a microprocessor including a cache memory subsystem.

2. Description of the Relevant Art

Cache-based computer architectures are typically associated with specialized bus transfer mechanisms to support efficient utilization of the cache memory and to maintain data coherency. A cache memory is a high-speed memory unit interposed in the memory hierarchy of a computer system between a slower system memory and a processor to improve effective memory transfer rates and accordingly improve system performance. The name refers to the fact that the small cache memory unit is essentially hidden and appears transparent to the user, who is aware only of a larger system memory. The cache is usually implemented by semiconductor memory devices having speeds that are comparable to the speed of the processor, while the system memory utilizes a less costly, lower-speed technology. The cache concept anticipates the likely reuse by the microprocessor of selected data in system memory by storing a copy of the selected data in the cache memory.

A cache memory typically includes a plurality of memory sections, wherein each memory section stores a block or a "line" of two or more words of data. For systems based on the particularly popular model 80486 microprocessor, a line consists of four "doublewords" (wherein each doubleword comprises four 8-bit bytes)m. Each line has associated with it an address tag that uniquely identifies which line of system memory it is a copy of. When a read request originates in the processor for a new word (or a new doubleword or a new byte), whether it be data or instruction, an address tag comparison is made to determine whether a copy of the requested word resides in a line of the cache memory. If present, the data is used directly from the cache. This event is referred to as a cache read "hit". If not present, a line containing the requested word is retrieved from system memory and stored in the cache memory. The requested word is simultaneously supplied to the processor. This event is referred to as a cache read "miss".

In addition to using a cache memory to retrieve data, the processor may also write data directly to the cache memory instead of to the system memory. When the processor desires to write data to memory, an address tag comparison is made to determine whether the line into which data is to be written resides in the cache memory. If the line is present in the cache memory, the data is written directly into the line. This event is referred to as a cache write "hit". As will be explained in greater detail below, in many systems a data "dirty bit" for the line is then set. The dirty bit indicates that data stored within the line is dirty (i.e., has been modified), and thus, before the line is deleted from the cache memory or overwritten, the modified data must be written into system memory.

If the line into which data is to be written does not exist in the cache memory, the line is either fetched into the cache memory from system memory to allow the data to be written into the cache, or the data is written directly into the system memory. This event is referred to as a cache write "miss". A line which is overwritten or copied out of the cache memory when new data is stored in the cache memory is referred to as a victim block or a victim line.

Cache memories can be optimized according to a number of different techniques. One aspect that affects system performance and design complexity is the handling of writes initiated by the processor or by an alternate bus master. As explained previously, because two copies of a particular piece of data or instruction code can exist, one in system memory and a duplicate copy in the cache, writes to either the system memory or the cache memory can result in an incoherence between the two storage units. For example, consider the case in which the same data is initially stored at a predetermined address in both the cache memory and the system memory. If the processor subsequently initiates a write cycle to store a new data item at the predetermined address, a cache write "hit" occurs and the processor proceeds to write the new data into the cache memory at the predetermined address. Since the data is modified in the cache memory but not in system memory, the cache memory and system memory become incoherent. Similarly, in systems with an alternate bus master, write cycles to system memory by the alternate bus master modify data in system memory but not in the cache memory. Again, the cache memory and system memory become incoherent.

An incoherence between the cache memory and system memory during processor writes can be prevented or handled by implementing one of several commonly employed techniques. In a first technique, a "write-through" cache guarantees consistency between the cache memory and system memory by writing the same data to both the cache memory and system memory. The contents of the cache memory and system memory are always identical, and thus the two storage systems are always coherent. In a second technique, a "write-back" cache handles processor writes by writing only to the cache memory and setting a "dirty" bit to indicate cache entries which have been altered by the processor. When "dirty" or altered cache entries are later replaced during a "cache replacement" cycle, the modified data is written back into system memory.

An incoherence between the cache memory and system memory during a write operation by an alternate bus master is handled somewhat differently. For a system that employs write-back caching, one of a variety of bus monitoring or "snooping" techniques may be implemented to determine whether certain lines of data within the cache memory should be invalidated or written-back to system memory when the alternate bus master attempts to write data to system memory. One such technique implemented within 80486-based systems is referred to as the "MESI" protocol. For systems that employ the MESI protocol, when an alternate bus master attempts to write data to system memory, a cache controller determines whether a corresponding line of data is contained within the cache memory. If a corresponding line is not contained by the cache memory, no additional action is taken by the cache controller, and the write cycle initiated by the alternate bus master is allowed to complete. If, on the other hand, a corresponding line of data is contained in the cache memory, the cache controller determines whether that line of data is dirty or clean. If the line is clean, the line is marked invalid by the cache controller and the transfer of data from the alternate bus master into system memory is allowed to complete. The line of data must be marked invalid since the modified (and thus the most up-to-date) data is now contained only within the system memory (following completion of the write cycle by the alternate bus master). If the line of data is instead dirty, a snoop write-back cycle is initiated by the cache controller which causes the alternate bus master to "back-off" and release mastership of the system bus. The cache controller then causes the entire line of dirty data within the cache memory to be written back into system memory. The snoop write-back cycle may be accomplished by executing a burst write cycle to system memory. During the data phase of a burst cycle, a new word (or doubleword) may be written to the system memory for each of several successive clock cycles without intervening address phases. The fastest burst cycle (no wait states) requires two clock cycles for the first word (one clock for the address, one clock for the corresponding word), with subsequent words written to sequential addresses on every subsequent clock cycle. When the cache controller finishes the dirty line write back, the line is marked clean (unmodified).

After the snoop write-back cycle completes, the alternate bus master re-obtains mastership of the system bus, and the write cycle by the alternate bus master is again executed. At this point, the new data is allowed to be written into the system memory, and the line in the cache is invalidated as previously described. It is noted that the snoop write-back cycle ensures that data coherency is maintained even if the writing of data from the alternate bus master does not involve an entire cache line.

An incoherence between the cache memory and the system memory during a read operation by an alternate bus master is treated similarly. When an alternate bus master attempts to read data from system memory, the cache controller determines whether a corresponding line of data is contained within the cache memory. If a corresponding line is contained by the cache memory, and if the corresponding line is dirty, a snoop write-back cycle is initiated by the cache controller which causes the alternate bus master to back-off and release mastership of the system bus. The cache controller then causes the entire line of dirty data within the cache memory to be written back into system memory. After the write-back cycle completes, the alternate bus master re-obtains mastership of the system bus, and the read cycle by the alternate bus master is re-initiated. At this point, the data within the system memory is allowed to be read.

In microprocessors including a cache memory subsystem, such as the model 80486 microprocessor, the bus arbitration inputs of the processor may force the processor to tri-state its address, data, and control pins. This tri-stating may be required as early as the next clock cycle following an input (e.g., BOFF) to the bus arbitration inputs. Under certain circumstances, the processor may be required to relinquish the bus after it has begun a bus transaction, but before the transaction is completed. In such a case, when the processor subsequently regains mastership of the bus, it will restart the transaction at the point the transaction was aborted. For most situations, since the address, data, and control information does not change during the tri-stated condition, the processor can store the information in latches at the output pads. This allows for new information to be queued up behind the pad latches in a pipelined fashion.

FIG. 1 illustrates microprocessor circuitry including a core logic circuit 12 coupled to a pad latch 14 and a tri-state driver 16. Similar pad latches and tri-state drivers (not shown) are provided for each output signal of the microprocessor. The output of tri-state driver 16 represents a data, address, or control output line of the microprocessor. The circuit arrangement illustrated in FIG. 1 allows for pipelined operations whereby, when a particular output signal is latched within latch 14 for output through tri-state driver 16, the signal for a subsequent clock cycle may be generated by core logic circuit 12 and provided to the input of latch 14.

As stated previously, if the processor is backed-off the bus and an aborted transaction occurs, the processor simply retains the output information in the latches of its output pads. In such a case, the processor can restart the transaction at the point the transaction was aborted when it regains mastership of the bus. Unfortunately, for configurations wherein the cache memory subsystem of the processor employs a write-back caching algorithm, if a snoop hit to dirty data residing in the cache occurs during the tri-stated condition caused by an aborted cycle, a snoop write-back cycle is required. This snoop write-back must occur as soon as the processor regains the bus, and before the aborted cycle is restarted. Since the write-back information propagates through the same pad latches to get to the address, data, and control buses, the information corresponding to the aborted cycle (which had been stored at the pad latches) is overwritten during the write-back cycle. When the write-back completes, the aborted cycle is eventually restarted, but an additional cycle or cycles are required to reload the pad latches with the appropriate address, data, and control information to drive the bus (since the core logic 22 stalls subsequent pipelined operations until the writeback is complete). As a result, overall system performance is deleteriously affected.

SUMMARY OF THE INVENTION

The problems outlined above are in large part solved by a microprocessor employing a technique for the restoration of an aborted cycle following a snoop write-back operation in accordance with the present invention. In one embodiment, a microprocessor is provided with an output pad logic circuit for each of its output lines. Each output pad logic circuit advantageously includes first and second latch circuits each configured to store output information at the same time. When the processor detects that a snoop write-back is pending, the second latch, referred to as a restore latch, preserves the information contained therein. During the snoop write-back operation, only the first latch stores the snoop write-back information and conveys the information to the output pins. When the snoop write-back operation is complete, an output enable signal is provided to the second latch to cause its stored information to be conveyed to the output pins upon the beginning of the next bus cycle. Subsequently, the second latch resumes capturing information along with the first latch. The output pad logic circuits within the microprocessor advantageously allow pipelined operations within the microprocessor and avoid the requirement of additional clock cycles to reload the output latch following a snoop write-back operation.

Broadly speaking, the present invention contemplates a microprocessor comprising a core logic circuit configured to implement a predetermined instruction set, an output pin, and an output pad logic circuit coupled between the core logic circuit and said output pin. The output pad logic circuit includes a first latch configured to store the signal from said core logic circuit and coupled to provide said signal to said output pin, a second latch circuit coupled to said core logic circuit and configured to store said signal concurrently with said first latch circuit, and a control logic circuit coupled between said core logic circuit and said second latch and configured to enable an output of said second latch circuit.

BRIEF DESCRIPTION OF THE DRAWINGS

Other objects and advantages of the invention will become apparent upon reading the following detailed description and upon reference to the accompanying drawings in which.

Figure 1:
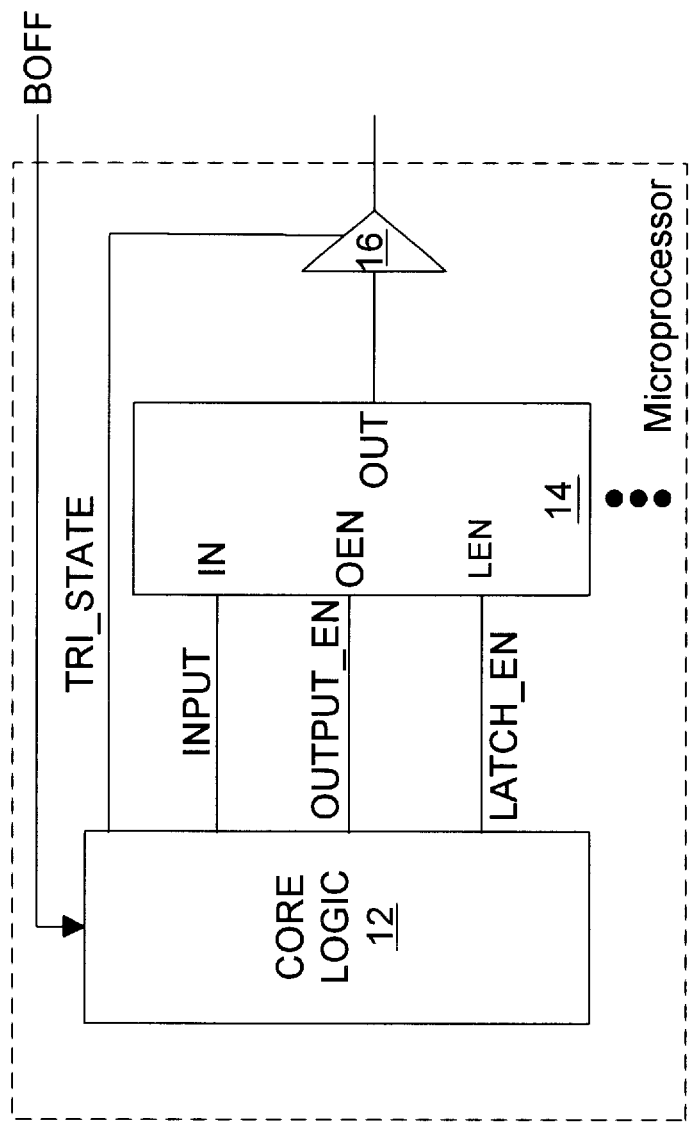
FIG. 1 is a block diagram of a microprocessor including a typical output pad logic circuit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
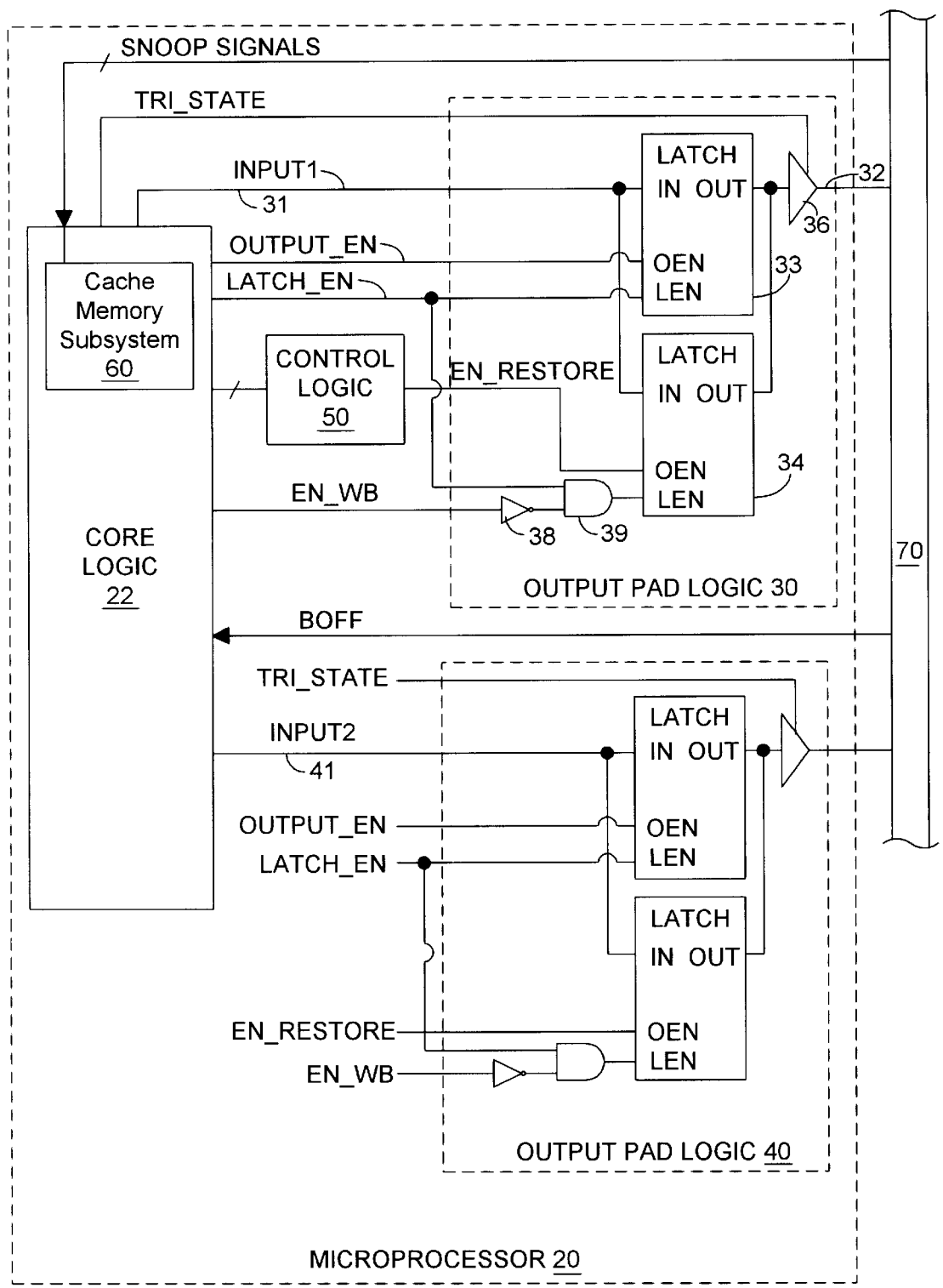
FIG. 2 is a block diagram of a microprocessor including an output pad logic circuit with a restore latch in accordance with the present invention.

Turning now to FIG. 2, a block diagram is shown of a microprocessor 20 employing a technique for the restoration of an aborted cycle following a snoop write-back operation in accordance with the present invention. As illustrated in FIG. 2, microprocessor 20 includes a core logic circuit 22 coupled to an output pad logic circuit 30 and to an output pad logic circuit 40. The core logic circuit 22 and each output pad logic circuit 30 and 40 are coupled to a control logic circuit 50.

Core logic circuit 22 is illustrative of, for example, core logic within a model 80486 microprocessor. It is understood, however, that core logic circuitry in accordance with a variety of alternative types of microprocessor implementations may be employed. For example, core logic 22 could implement a Pentium-compatible instruction set.

Core logic circuit 22 is depicted with a cache memory subsystem 60. Cache memory subsystem 60 is configured to implement a write-back caching algorithm, and is thus connected to a processor bus 70 to allow snooping operations for cache consistency. It is understood that core logic 22 may further be coupled via numerous additional external pins and lines to processor bus 70. Such conventional aspects of microprocessor 20 have been omitted herein for simplicity and clarity.

Output pad logic circuit 30 includes a latch 33, referred to as the primary output latch, and a latch 34, referred to as the restore latch. Output pad logic circuit 30 further includes a tri-state driver 36 coupled to the outputs of latches 33 and 34, and an inverter 38 and an AND gate 39 coupled to the latch enable input LEN of latch 34.

Output pad logic circuit 30 is provided to receive a signal generated by core logic 22 and conveyed by line 31. The output pad logic circuit 30 latches the signal and drives it at an output pad associated with an external package pin 32 of the microprocessor. Pin 32 is coupled to a processor bus 70. Output pad logic circuit 40 is similarly configured to drive another signal at line 41 from core logic 22 upon a second output pin of the processor. It is understood that a plurality of additional output pad logic circuits (not shown) is further provided within microprocessor 20 for other output signals. In the interest of simplicity and clarity, only output pad logic circuit 30 is described in detail below. Other output pad logic circuits operate similarly.

During normal operation, a signal generated by core logic circuit 22 to be output from the microprocessor at output pin 32 is provided at input line 31. A latch disable signal labeled EN_WB is normally low. Accordingly, when the latch enable signal LATCH_EN is asserted at line 32, the input signal at line 31 is latched within both latch 33 and latch 34. Core logic 22 subsequently asserts the output enable signal OUTPUT_EN which enables the output of latch 33. Core logic 22 further asserts the tri-state driver control signal labeled TRI_STATE, which causes the signal stored within latch 33 to be driven upon processor bus 70 through pin 32. It is noted that at this point, the output enable signal of latch 34 labeled EN_RESTORE is deasserted, and thus the output of latch 34 is tri-stated. It is further noted that when a signal is being driven upon processor bus 70 through the output of latch 33, the next state of the output pin 32 may be generated by core logic 22 and provided to the input of latches 33 and 34 via line 31 in a pipelined fashion. Subsequent cycles are treated similarly.

If at any point the processor 20 is backed off the bus and a cycle is aborted, the output within latch 33 is retained, assuming a snoop write-back operation is not required. When the processor 20 regains mastership of processor 70, the output signal from latch 33 can be again driven upon processor bus 70 to resume the cycle, without the requirement of extra cycles to load latch 33.

If the core logic circuit 22 detects that a snoop write-back operation must be initiated during the tri-stated condition caused by an aborted cycle, latch disable signal EN_WB is asserted high, which prevents latch 34 from latching the snoop write-back output information. Accordingly, when processor 20 effectuates the snoop write-back operations, the snoop write-back information is stored by latch 33 and not by latch 34. Instead, the restore latch 34 retains the output reflecting the aborted cycle at the time the processor 20 was backed off bus 70.

Upon completion of the snoop write-back operation, an output enable signal EN_RESTORE is asserted by control logic 50. This occurs at the beginning of the bus cycle immediately following the snoop write-back operation, assuming no additional write-back operations are required, and causes the content of latch 34 to be driven at the output of latch 34. At the same time, the TRI_STATE signal is asserted, which causes the output of latch 34 to be driven upon processor bus 70 through tri-state driver 36. It is noted that at this point, the output enable signal OUTPUT_EN to latch 33 is deasserted by core logic 22 to avoid an output conflict between latch 33 and 34.

After the content of latch 34 is driven upon processor bus 70, the latch disable signal EN_WB is again deasserted, which allows new information to be stored within latch 34 as well within latch 33. This information is then driven upon processor bus 70 through latch 33, in a manner as described previously, until another cycle is aborted and additional write-back cycles are required.

Figure 3:
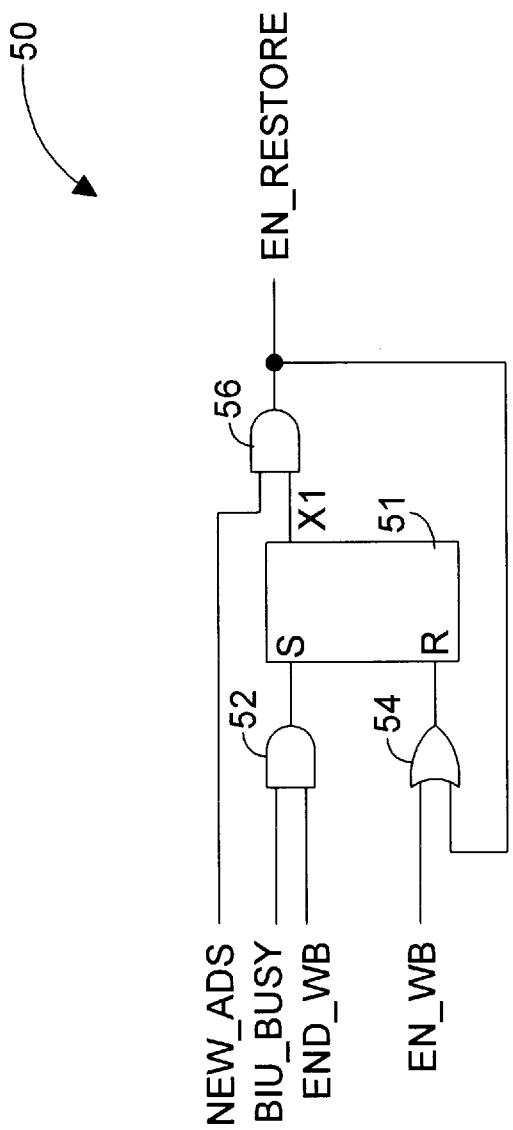
FIG. 3 is a block diagram of a control logic circuit.

FIG. 3 illustrates circuitry embodying one implementation of control logic circuit 50. As stated previously, control logic circuit 50 controls the generation of the output enable signal EN_RESTORE. Control logic circuit 50 receives signals NEW_ADS, BIU_BUSY, END_WB, and EN_WB from core logic circuit 22. These signals, along with other signals associated with the output pad logic circuit 30, are illustrated in the timing diagram of FIG. 4. The timing diagram of FIG. 4 exemplifies a situation wherein two write-back cycles are required following an aborted transaction.

As stated previously the EN_RESTORE signal generated by control logic 50 is normally low. If core logic circuit 22 detects that a snoop write-back operation is pending (or required), the EN_WB signal is asserted high. This causes the EN_RESTORE signal generated by control logic circuit 50 to remain low. When the write-back operation completes, the core logic circuit 22 asserts the END_WB signal and deasserts the EN_WB signal. Core logic circuit 22 further asserts the BIU_BUSY signal high if an aborted cycle is pending. Accordingly, upon completion of a given write-back cycle (END_WB=1) following an aborted cycle (BIU_BUSY=1), latch 51 is set, assuming no additional snoop write-back cycles are pending (i.e., EN_WB=0). When latch 51 is set, the EN_RESTORE and TRI_STATE signals are asserted high upon assertion of a new address strobe signal NEW_ADS by core logic 22. Gating the output of latch 51 through AND gate 56 with the NEW_ADS signal prevents the restored data from propagating to the output pin 32 until the next ADS# cycle. When the EN_RESTORE signal goes high, the pulse is fed back to clear latch 51 through lower gate 54.

Figure 4:
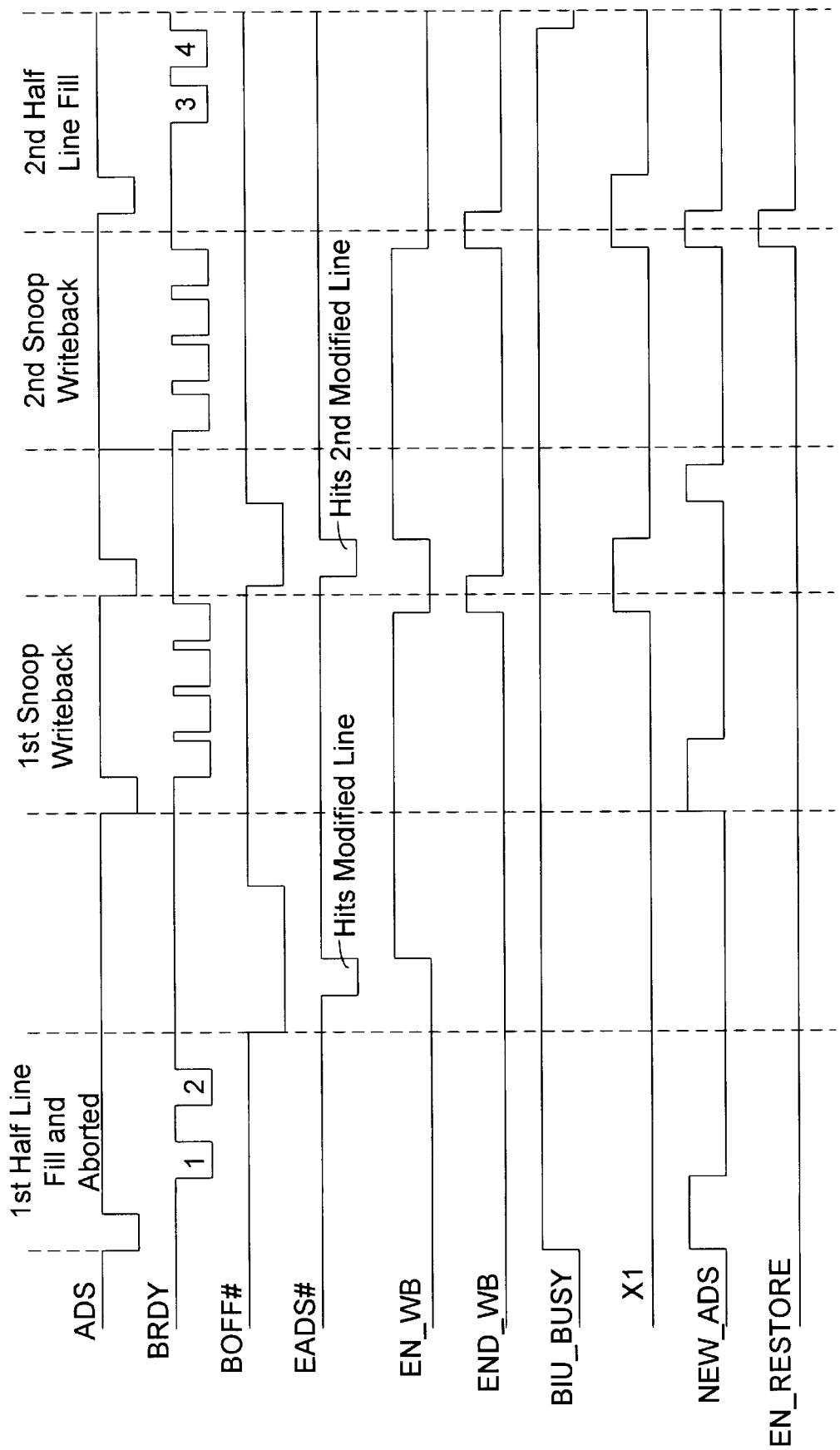
FIG. 4 is a timing diagram that illustrates operation of the output pad logic circuit of FIG. 2.

It is noted that latch 51 is also cleared by signal EN_WB in order to accommodate situations wherein two write-backs (or more) occur before the aborted cycle can be restarted. In this situation, as illustrated in FIG. 4, the END_WB signal from the first write-back will set latch 51. However, before the processor can restore the aborted cycle, the processor is forced off the bus again, a second snoop hits a modified line in the cache, and a second write-back is required. The EN_WB signal is asserted for the second write-back, thus clearing latch 51. At the end of the second write-back, the END_WB signal is again asserted, thus setting latch 51. Any further writeback operations that occur before the aborted cycle can be restarted are treated similarly.

In accordance with the microprocessor 20 as described above, output information relating to an aborted cycle is advantageously retained within a restore latch 34 while information corresponding to a snoop write-back operation is fed through a primary latch to the output pins of the processor. Immediately upon the next clock cycle following completion of the snoop write-back operation, the information from the restore latch is driven upon the output pin of the processor to complete the aborted cycle. Since the information is retained within the restore latch, continuous pipelined operations are supported and additional clock cycles to restore the aborted cycle may be avoided, even though core logic 22 stalls additional cycles until a write-back operation is completed. As a result, the overall performance of the microprocessor may be improved.

The invention described in the above detailed description is not intended to be limited to the specific form set forth herein, but on the contrary, it is intended to cover such alternatives, modifications, and equivalents, as can be reasonably included within the spirit and scope of the invention as defined.

What is claimed is:

1. A microprocessor comprising:
    a core logic circuit configured to implement a predetermined instruction set;
    an output pin; and
    an output pad logic circuit coupled between said core logic circuit and said output pin, wherein said output pad logic circuit is configured to drive a signal generated by said core logic circuit upon said output pin, and wherein said output pad logic circuit includes:
        a first latch configured to store said signal from said core logic circuit and coupled to provide said signal to said output pin;
        a second latch circuit coupled to said core logic circuit and configured to store said signal concurrently with said first latch circuit; and
        a control logic circuit coupled between said core logic circuit and said second latch and configured to enable an output of said second latch circuits;
        wherein said control logic circuit is configured to enable said output of said second latch circuit when an aborted cycle is pending and in response to completion of a snoop writeback operation.

2. The microprocessor as recited in claim 1 wherein said core logic circuit includes a cache memory subsystem.

3. The microprocessor as recited in claim 1 wherein said first latch circuit receives an output enable signal from said core logic to enable an output of said first latch circuit, and wherein said core logic circuit asserts said output enable signal to cause a content stored within said first latch circuit to be driven upon said output pin.

4. The microprocessor as recited in claim 3 wherein said first latch circuit receives a latch enable signal from said core logic circuit, wherein an assertion of said latch enable signal causes said signal to be latched within said first latch circuit.

5. The microprocessor as recited in claim 4 wherein said second latch circuit is configured to store said signal from said core logic circuit in response to an assertion of said latch enable signal if a snoop writeback operation is not pending.

6. The microprocessor as recited in claim 5 wherein said second latch circuit is configured to retain a content indicative of an aborted cycle when said first latch circuit is loaded with information indicative of a snoop writeback cycle.

7. The microprocessor as recited in claim 1 wherein said core logic circuit is configured to generate a control signal indicative of whether an aborted cycle is pending.

8. The microprocessor as recited in claim 1 further comprising a tri-state driver coupled between an output of said first latch circuit and said output pin.

9. The microprocessor as recited in claim 7 wherein said control logic circuit further receives a second control signal generated by said core logic circuit indicative of a completion of a snoop writeback operation.

10. The microprocessor as recited in claim 8 wherein an input of said tri-state driver is coupled to said output of said first latch circuit and to an output of said second latch circuit.

11. A microprocessor comprising:
    a core logic circuit configured to implement a predetermined instruction set;
    an output pin; and
    an output pad logic circuit coupled between said core logic circuit and said output pin, wherein said output pad logic circuit is configured to drive a signal generated by said core logic circuit upon said output pin, and wherein said output pad logic circuit includes:
        a first latch configured to store said signal from said core logic circuit and coupled to provide said signal to said output pin;
        a second latch circuit coupled to said core logic circuit and configured to store said signal concurrently with said first latch circuit; and
        a control logic circuit coupled between said core logic circuit and said second latch and configured to enable an output of said second latch circuit;
        wherein said first latch circuit receives an output enable signal from said core logic to enable an output of said first latch circuit, and wherein said core logic circuit asserts said output enable signal to cause a content stored within said first latch circuit to be driven upon said output pin;

wherein said first latch circuit receives a latch enable signal from said core logic circuit, wherein an assertion of said latch enable signal causes said signal to be latched within said first latch circuit; and wherein said second latch circuit is configured to store said signal from said core logic circuit in response to an assertion of said latch enable signal if a snoop writeback operation is not pending.

12. The microprocessor as recited in claim 11 wherein said core logic circuit includes a cache memory subsystem.

13. The microprocessor as recited in claim 11 wherein said second latch circuit is configured to retain a content indicative of an aborted cycle when said first latch circuit is loaded with information indicative of a snoop writeback cycle.

14. The microprocessor as recited in claim 11 wherein said control logic circuit is configured to generate another signal to enable said output of said second latch circuit in response to completion of a snoop writeback operation if an aborted cycle is pending.

15. The microprocessor as recited in claim 14 wherein said core logic circuit is configured to generate a control signal indicative of whether an aborted cycle is pending.

16. The microprocessor as recited in claim 15 wherein said control logic circuit further receives a second control signal generated by said core logic circuit indicative of a completion of a snoop writeback operation.

17. The microprocessor as recited in claim 11 further comprising a tri-state driver coupled between an output of said first latch circuit and seaid output pin.

18. The microprocessor as recited in claim 17 wherein an input of said tri-state driver is coupled to said output of said first latch circuit and to an output of said second latch circuit.

19. The microprocessor as recited in claim 1 wherein said control logic circuit is further configured to disable said output of said second latch circuit during non-snoop write back operations.

* * * * *

UNITED STATES PATENT AND TRADEMARK OFFICE
CERTIFICATE OF CORRECTION

PATENT NO. : 5,813,035

DATED : February 23, 1996

INVENTOR(S) : Jody A. McCoy and William A. Hughes

It is certified that error appears in the above-identified patent and that said Letters Patent is hereby corrected as shown below:

In the Claims:

Claim 17, col. 10, line 10, please change "seaid" to "said".

Signed and Sealed this

Second Day of February, 1999

Attest:

Attesting Officer

*Acting Commissioner of Patents and Trademarks*